(12) United States Patent
Parupati et al.

(10) Patent No.: US 11,347,961 B2
(45) Date of Patent: *May 31, 2022

(54) USING AN ILLUMINATION SEQUENCE PATTERN FOR BIOMETRIC AUTHENTICATION

(71) Applicant: Advanced New Technologies Co., Ltd., George Town (KY)

(72) Inventors: Srikanth Parupati, Malden, MA (US); Zikomo Fields, Lake Lotawana, MO (US); Reza R. Derakhshani, Shawnee, KS (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,148

(22) Filed: Feb. 19, 2020

(65) Prior Publication Data

US 2020/0311449 A1    Oct. 1, 2020

Related U.S. Application Data

(63) Continuation of application No. 16/370,525, filed on Mar. 29, 2019.

(51) Int. Cl.
*G06K 9/00* (2006.01)
*G06K 9/62* (2006.01)

(52) U.S. Cl.
CPC ....... *G06K 9/00885* (2013.01); *G06K 9/6202* (2013.01); *G06K 9/00234* (2013.01)

(58) Field of Classification Search
None
See application file for complete search history.

(56) References Cited

U.S. PATENT DOCUMENTS

| | | | |
|---|---|---|---|
| 10,281,408 B2 | 5/2019 | Konno et al. |
| 10,303,963 B1 | 5/2019 | Edwards et al. |
| 10,346,675 B1 | 7/2019 | Nagalla |
| 10,687,034 B1 | 6/2020 | Berkovich |
| 2003/0227550 A1 | 12/2003 | Manico et al. |
| 2005/0195292 A1 | 9/2005 | McIntyre et al. |
| 2009/0201377 A1 | 8/2009 | Okano |
| 2010/0253788 A1 | 10/2010 | Okano |

(Continued)

*Primary Examiner* — Fan Zhang
(74) *Attorney, Agent, or Firm* — Fish & Richardson P.C.

(57) ABSTRACT

Technology described herein includes a method that includes receiving, at one or more processing devices, data corresponding to a first image, and determining, by the one or more processing devices based on the received data, that a first set of pixel values of the first image corresponds to illumination of a first representative wavelength, and at least a second set of pixel values of the first image corresponds to illumination of a second representative wavelength. The illuminations of the first and second representative wavelengths constitute at least a portion of a first illumination sequence pattern used in capturing the first image. The method also includes determining that the first illumination sequence pattern matches a second illumination sequence pattern associated with a device from which the first image is expected to be received, and in response, initiating a biometric authentication process for authenticating a subject represented in the first image.

20 Claims, 7 Drawing Sheets

(56) References Cited

U.S. PATENT DOCUMENTS

| | | |
|---|---|---|
| 2011/0181873 A1 | 7/2011 | Yavets-Chen et al. |
| 2011/0292179 A1 | 12/2011 | Hernandez et al. |
| 2012/0084652 A1 | 4/2012 | Martinez Bauza et al. |
| 2013/0010057 A1 | 1/2013 | Borel et al. |
| 2013/0057646 A1 | 3/2013 | Chen et al. |
| 2013/0265426 A1 | 10/2013 | Fan et al. |
| 2014/0002509 A1 | 1/2014 | Kim et al. |
| 2015/0109416 A1 | 4/2015 | Gallup et al. |
| 2015/0172628 A1 | 6/2015 | Brown et al. |
| 2015/0282046 A1 | 10/2015 | Shin et al. |
| 2015/0348313 A1 | 12/2015 | Fuchikami et al. |
| 2016/0076942 A1 | 3/2016 | Zawaideh et al. |
| 2016/0156842 A1 | 6/2016 | Baldwin |
| 2016/0163057 A1 | 6/2016 | Rowley et al. |
| 2016/0261860 A1 | 9/2016 | Gu et al. |
| 2016/0295202 A1 | 10/2016 | Evans et al. |
| 2017/0191946 A1 | 7/2017 | Smith et al. |
| 2018/0270465 A1 | 9/2018 | Bendall |
| 2019/0034720 A1* | 1/2019 | He .................... G06K 9/00503 |
| 2019/0044723 A1* | 2/2019 | Prakash ............. G06K 9/00288 |
| 2019/0147156 A1 | 5/2019 | Burri et al. |
| 2019/0303551 A1 | 10/2019 | Tussy |
| 2020/0128166 A1* | 4/2020 | Fukumoto ............ A61B 1/0661 |
| 2020/0249428 A1* | 8/2020 | Sugiyama ............ H04N 5/2254 |

\* cited by examiner

USING AN ILLUMINATION SEQUENCE PATTERN FOR BIOMETRIC AUTHENTICATION

CROSS-REFERENCE TO RELATED APPLICATIONS

This application is a continuation of and claims the benefit of priority of U.S. patent application Ser. No. 16/795,148, filed Feb. 19, 2020, and each application is hereby incorporated by reference in its entirety.

TECHNICAL FIELD

This specification generally relates to image capture devices.

BACKGROUND

Systems incorporating a biometric identification technology such as face recognition or iris recognition often include a camera that captures an image of a user. The captured image is then processed to authenticate the user using the biometric identification technology.

SUMMARY

Implementations of the present disclosure are generally directed to image capture devices employed within a biometric authentication system. More specifically, implementations are directed to capturing images of a subject in a rolling shutter mode, where frequency of illumination from at least one illumination source is varied and synchronized with a rolling shutter using an illumination sequence pattern. A captured image can be used in a biometric authentication process. For example, a captured image can have pixels values that correspond to the illumination sequence pattern. The biometric authentication process can include verifying that the illumination sequence pattern used in capturing the image matches an expected illumination sequence pattern associated with a device from which the captured image is expected to be received. For instance, the biometric authentication process can include verifying that the image was captured by a particular kiosk.

In one aspect, this document describes a method that includes receiving, at one or more processing devices, data corresponding to a first image, and determining, by the one or more processing devices based on the received data, that a first set of pixel values of the first image corresponds to illumination of a first representative wavelength, and at least a second set of pixel values of the first image corresponds to illumination of a second representative wavelength. The illuminations of the first and second representative wavelengths constitute at least a portion of a first illumination sequence pattern used in capturing the first image. The method also includes determining that the first illumination sequence pattern matches a second illumination sequence pattern associated with a device from which the first image is expected to be received, and in response, initiating a biometric authentication process for authenticating a subject represented in the first image.

In another aspect, this document describes a system that includes a transceiver that receives data corresponding to a first image captured using an image sensor, and one or more processing devices. The one or more processing devices perform operations that include determining, based on the received data, that a first set of pixel values of the first image corresponds to illumination of a first representative wavelength, and at least a second set of pixel values of the first image corresponds to illumination of a second representative wavelength. The illuminations of the first and second representative wavelengths constitute at least a portion of a first illumination sequence pattern used in capturing the first image. The operations further include determining that the first illumination sequence pattern matches a second illumination sequence pattern associated with a device from which the first image is expected to be received, and in response, initiating a biometric authentication process for authenticating a subject represented in the first image.

In another aspect, this document describes one or more non-transitory computer-readable storage devices coupled to one or more processors and having instructions stored thereon which, when executed by the one or more processors, cause the one or more processors to perform various operations. The operations include receiving data corresponding to a first image, and determining, based on the received data, that a first set of pixel values of the first image corresponds to illumination of a first representative wavelength, and at least a second set of pixel values of the first image corresponds to illumination of a second representative wavelength. The illuminations of the first and second representative wavelengths constitute at least a portion of a first illumination sequence pattern used in capturing the first image. The operations also include determining that the first illumination sequence pattern matches a second illumination sequence pattern associated with a device from which the first image is expected to be received, and in response, initiating a biometric authentication process for authenticating a subject represented in the first image.

In another aspect, this document describes a computer-implemented method that includes identifying a illumination sequence pattern to be used when capturing an image of a subject. The method also includes controlling, based on the illumination sequence pattern, an illumination source to illuminate the subject using a first representative wavelength, and capturing, based on the illumination sequence pattern, a first set of pixel values of the image of the subject while the subject is illuminated using the first representative wavelength. The method further includes controlling, based on the illumination sequence pattern, the illumination source to illuminate the subject using a second representative wavelength, wherein the second representative wavelength is different than the first representative wavelength. The image of the subject is then provided to a biometric authentication system.

Implementations of the above aspects can include one or more of the following features. The first image can be captured using a rolling shutter that exposes the pixels of an image sensor in a row-wise manner or a column-wise manner. Data corresponding to a second image can be received at one or more processing devices, and a determination may be made that a first set of pixel values of the second image corresponds to illumination of a third representative wavelength, and at least a second set of pixel values of the second image corresponds to illumination of a fourth representative wavelength. The illuminations of the third and fourth wavelengths can constitute at least a portion of a third illumination sequence pattern used in capturing the second image. A determination may be made that the third illumination sequence pattern is different from the second illumination sequence pattern associated with the device, and in response, the second image may be prevented from being used in the biometric authentication process. The rolling shutter and an illumination source can be synchronized during the capturing of the first image, according to the first illumination sequence pattern. The illumination source can be configured to generate electromagnetic radiation at multiple wavelengths. The biometric authentication process can include authenticating the subject based on comparing the image to a template image of the subject. The template image of the subject can be captured during an enrollment process. Information can be presented to the subject upon authentication of the subject.

Particular implementations of the subject matter described in this disclosure can be implemented so as to realize one or more of the following advantages. Implementations of the present disclosure can be used, for example, for identifying hardware and biometric presentation attacks in real-time, based on images captured in a rolling shutter mode. In some implementations, use of the rolling shutter mode can produce a predictable spatial color banding on a face of a subject that is alive and in front of a camera. Accordingly, color band reflectance responses can be used in spoof detection to discriminate between live face skin and spoof materials such as silicon, plastic, or paper. In some cases, the technology described herein allows for implementing a spoof detection system and/or a hardware attack prevention system while reducing requirements for additional hardware. This in turn, in some cases, can reduce costs associated with an underlying biometric authentication system.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
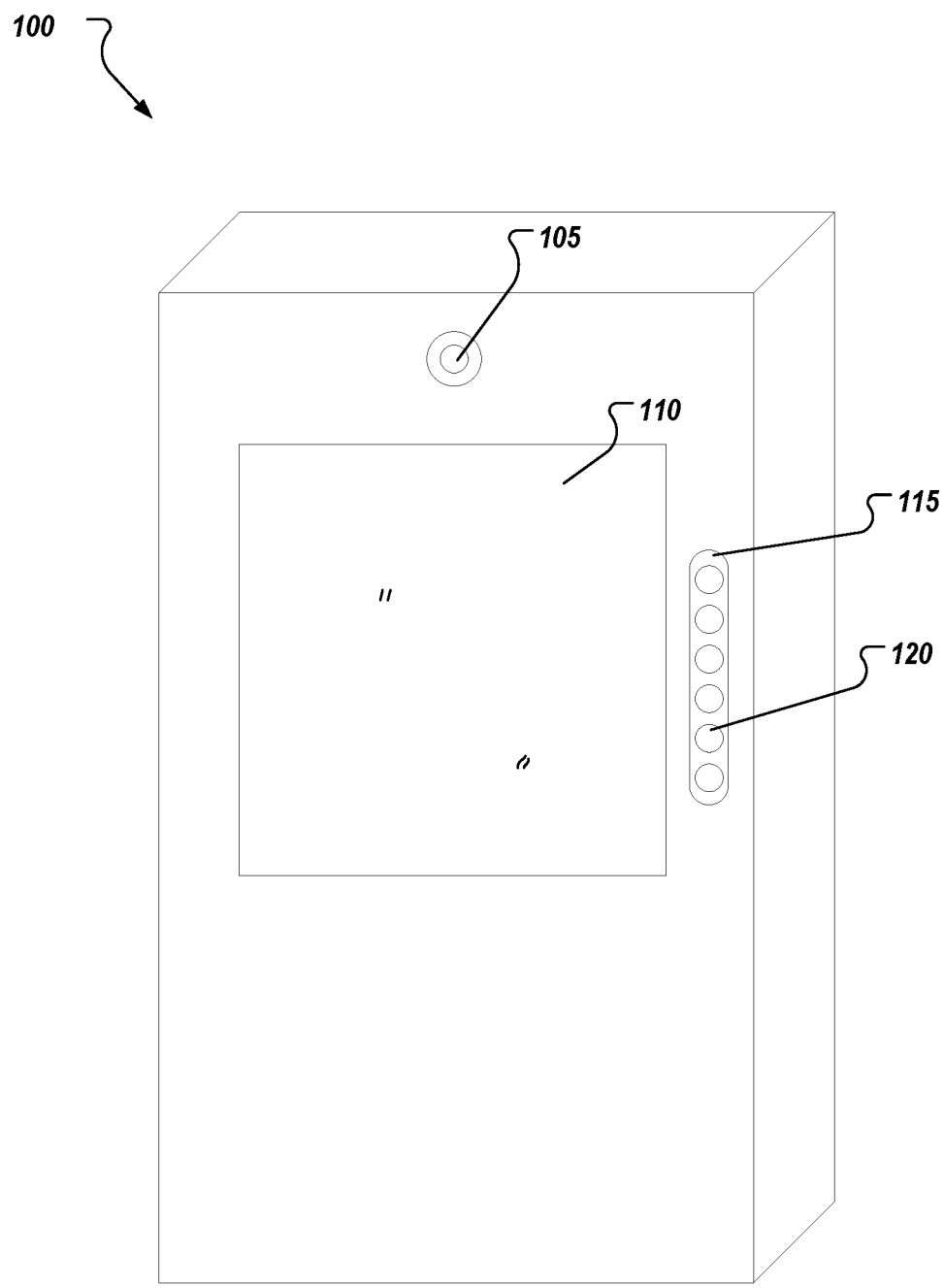
FIG. 1 depicts a kiosk machine as an example environment to which a biometric authentication system may deployed.

Implementations of the present disclosure are generally directed to capturing images of a subject using a rolling shutter of a camera that works in coordination with one or more illumination sources that are controlled according to an illumination sequence pattern (e.g., a coded light sequence), for securing a device associated with the camera. In some implementations, the illumination sequence pattern defines a sequence of various wavelengths of light that are to be radiated from the illumination source. Implementations of the present disclosure can be used, for example, for identifying hardware and biometric presentation attacks in real-time by verifying illumination sequence patterns. A subsequent biometric authentication process can be initiated (or prevented) for the subject based on illumination sequence pattern verification results.

In general, various biometric identification/authentication systems are based on capturing one or more images, which are then compared with or analyzed with reference to template images captured during an enrollment process. For example, a biometric authentication system that uses face identification may require enrolling users to pose for one or more images of their face during an enrollment process. The images captured during the enrollment process may be stored on a storage device accessible to the biometric authentication system. During run-time, a facial image of a user can be captured and compared with one or more template images to determine if the user may be authenticated.

In an example context, a biometric authentication system may be deployed in a kiosk-type device, such as an automated teller machine (ATM). The kiosk may include a camera that can be used by the biometric authentication system to capture run-time images of users. The camera component of a kiosk may include a shutter. A shutter is a device that allows light to pass for a determined period, exposing photographic film or a light-sensitive electronic sensor to light in order to capture a permanent image of a scene. A mechanical shutter uses conventional front and rear shutter curtains located in front of the sensor which open and close to produce the exposure.

A rolling shutter is a method of image capture in which a still picture (in a still camera) or each frame of a video (in a video camera) is captured by scanning across the scene, either vertically or horizontally, such that all of the parts of an image of a scene are recorded although not at exactly the same instant. During playback, however, the image of the scene can be displayed at once, as if it represents a single instant in time. A rolling shutter is in contrast with "global shutter" in which the entire frame is captured at the same instant. The rolling shutter can be engaged as a mode for a camera that captures the rows (or other portions) of pixels through either a mechanical or electronic means as described above.

In view of the foregoing, and as described in further detail herein, implementations of the present disclosure provide for a biometric authentication system. For example, a server (or another device) can receive data corresponding to an image captured at, for example, a kiosk device. The server can determine, based on the received data, whether the captured image includes pixel values that correspond to an expected illumination sequence pattern. In response to determining that the captured image includes pixel values corresponding to an expected illumination sequence pattern, a biometric authentication process for authenticating a subject represented in the first image can be initiated. In response to determining that the captured image does not include pixel values corresponding to the expected illumination sequence pattern, the server can prevent the captured image from being used in the biometric authentication process.

FIG. 1 depicts a kiosk machine 100 as an example environment to which a biometric authentication system may deployed. Such kiosk machines may be used for various purposes that require authenticating users via one or more biometric authentication processes. For example, the kiosk 100 can include an ATM that allows a user to withdraw money from a bank account. In another example, the kiosk 100 may be deployed at a restaurant or a fast-food outlet, and allow a user to order and pay for food. The kiosk 100 may also be deployed at an entry point (e.g., at the gate of an arena or stadium) to authenticate entrants prior to entering the venue. In general, the kiosk 100 may be deployed at various types of locations to authenticate users interactively, or even without any active participation of the user.

In some implementations, the kiosk 100 can include one or more components that support a biometric authentication system. For example, the kiosk 100 can include a camera 105. The camera 105 can be employed to capture images of, for example, users interacting with the kiosk 100. In some examples, the captured image(s) can be processed in the biometric authentication process to identify/authenticate valid users, and/or permit or deny access to the services/products being offered through the kiosk. For example, the kiosk 100 may include a display device 110 (e.g., a capacitive touch screen) that allows a user to select and order food at a retail outlet. Once the user completes the selection via user-interfaces presented on the display device 110, the user may be asked to look towards the camera 105 for authentication. The images captured using the camera 105 may then be used to authenticate/identify a pre-stored profile for the user, and the payment for the food may then be automatically deducted from an account linked to the profile.

The kiosk 100 can include an illumination source 115. Although one illumination source 115 is displayed, the kiosk 100 may include multiple illumination sources. Although implementations of the present disclosure are described as using one illumination source, multiple illumination sources can be used. The illumination source 115 is configured to generate electromagnetic radiation at multiple wavelengths. For example, the illumination source 115 can include one or more light emitting diode (LED) elements 120 that may be controlled to generate electromagnetic radiation patterns or sequences at different wavelength ranges. The wavelength ranges can include, for example, the visible spectrum of about 400-700 nm, the NIR spectrum of about 700-1400 nm, and/or wavelengths in the 320-400 nm range.

The kiosk 100 can receive, for example, from a biometric authentication service, a programmable code (e.g., key) that describes an illumination sequence pattern. In some implementations, the illumination source 115 can be configured to radiate electromagnetic radiations according to the illumination sequence pattern such that at a given time, the illumination source 115 radiates illumination at a first wavelength range that is at least partially non-overlapping with a second wavelength range subsequently radiated from the illumination source 115. The first wavelength range can include a first representative wavelength and the second wavelength range can include a different, second representative wavelength. In some implementations, the first wavelength range and/or the second wavelength range include additional wavelengths other than the first representative wavelength or the second representative wavelength, respectively.

In some implementations, the illumination source 115 can illuminate a subject's face in a specified light color pattern and capture an image of the subject in a rolling shutter mode. For instance, illuminations from the illumination source 115 performed in accordance with the received illumination sequence pattern can be synchronized with a rolling shutter of the camera 105 that sequentially exposes sets of pixels of an image sensor. In some implementations, the rolling shutter camera line scan frequency is synchronized with the received illumination sequence pattern that controls light radiated from the illumination source 115 by employing, for example, the camera's general-purpose input/output (GPIO), which signals when an exposure begins. Illuminations radiated from the illumination source 115 can be synchronized with the rolling shutter as different portions of pixels are collected for an image. For example, the illumination source 115 can be controlled to fire according to the illumination sequence pattern as the shutter moves across the aperture/sensor exposing each portion (e.g., row, column) of pixels. For example, an illumination sequence performed according to the illumination sequence pattern may including firing of the illumination source 115 at a first wavelength range for a first set of one or more rows and at a second wavelength range for a subsequent set of one or more rows.

Due to a rolling shutter effect, the captured image can include colored bands colored according to the illumination sequence pattern. Each image captured by the camera 105, where pixel capture is synchronized with the illumination source 115 according to the illumination sequence pattern, thus has an identifiable illumination pattern. For example, an image may include an illumination pattern that includes a first set of rows of pixels where the subject was illuminated with a first wavelength range that includes a first representative wavelength and a second set of rows of pixels where the subject was illuminated with a second wavelength range that includes a second representative wavelength. The previous and following example illumination sequence patterns include two wavelengths synchronized with two sets of pixel portions as an example; however, any number of wavelengths and sets of pixel portions may be specified by an illumination sequence pattern. An illumination sequence pattern can be used to, for example, verify that the image was captured by a particular kiosk.

For instance, the kiosk 100 can send the captured image that includes the illumination pattern to a server (or other device or system) for verification. The server can decode the key from the received image and verify the decoded key against a key which was originally sent to the kiosk 100. Accordingly, the server can challenge the kiosk 100 dynamically by changing programmable codes (keys) in real-time, for real-time identification of hardware and biometric presentation attacks. Accordingly, security of the biometric system can be improved. For example, if the server determines that the image includes an expected illumination pattern, a biometric authentication process can be initiated for the user. As another example, if the server determines that the image does not include an expected illumination pattern, further processing can be prevented (e.g., further authentication of the user can be halted and the user can be denied access to the kiosk 100 or other system(s)). The server can determine, for example, that an image was sent by an imposter system in an attempt to fool the server that the image was obtained by a kiosk. Imposter attacks can be thwarted due to imposter systems not knowing a key corresponding to the kiosk 100 (e.g., a current kiosk key can be a shared secret between the kiosk 100 and the server).

In some implementations, the images captured using the camera 105 can be further processed in the biometric authentication process to identify/authenticate the user. In some implementations, the biometric authentication system may extract from the images, various features, such as features derived from the face, iris, vasculature underlying the sclera of the eye, or the periocular region, and so forth, to identify/authenticate a particular user based on matching the extracted features to that of one or more template images stored for the user during an enrollment process. The biometric authentication system may use a machine-learning process (e.g., a deep learning process implemented, for example, using a deep neural network architecture) to match the user to one of the many templates stored for various users of the system. In some implementations, the machine-learning process may be implemented, at least in part, using one or more processing devices deployed on the kiosk 100. In some implementations, the kiosk 100 may communicate with one or more remote processing devices (e.g., one or more remote servers) that implement the machine learning process (see FIG. 2).

Figure 2:
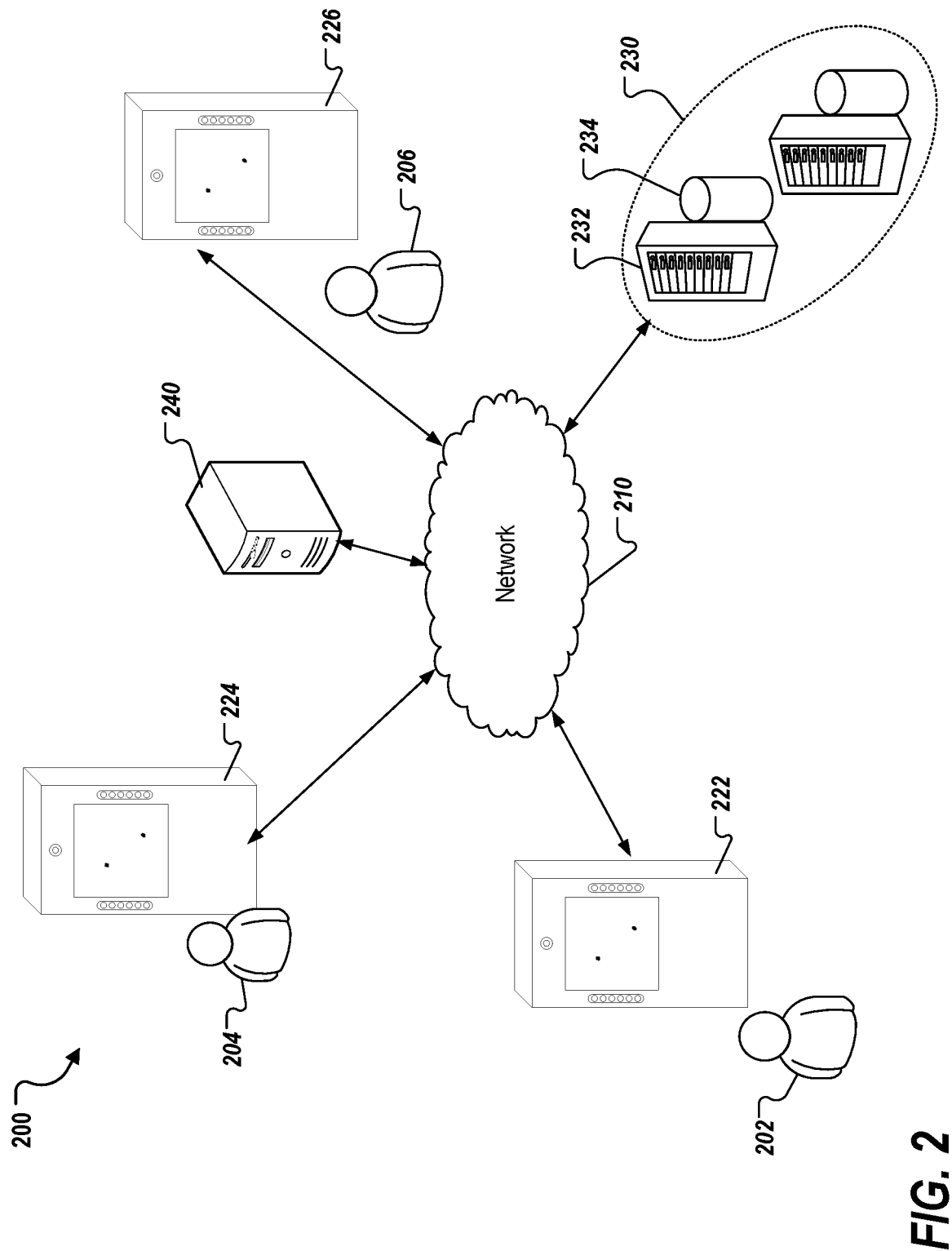
FIG. 2 depicts an example environment that can be employed to multi instances of a biometric authentication system.

FIG. 2 depicts an example environment 200 that can be employed to execute and/or coordinate multi instances of the described biometric authentication system. The example environment 200 includes network 210, a back-end system 230, and kiosk devices 222-226. The kiosk devices 222-226 are substantially similar to the kiosk device 100 of FIG. 1.

In some implementations, the network 210 includes a local area network (LAN), wide area network (WAN), the Internet, or a combination thereof, and connects computing devices (e.g., the kiosk devices 222-226) and back-end systems (e.g., the back-end system 230). In some implementations, the network 210 can be accessed over a wired and/or a wireless communications link.

In the depicted example, the back-end system 230 includes at least one server system 232 and a data store 234. In some implementations, the back-end system 230 provides access to one or more computer-implemented services with which the kiosks 222-226 may interact. The computer-implemented services may be hosted on, for example, the at least one server system 232 and the data store 234. The computer-implemented services may include, for example, an authentication service that may be used by the kiosks 222-226 to authenticate a user based on collected image data.

For example, as part of a biometric authentication service, the server system 232 may send a programmable code (e.g., key) to one of the kiosks 222-226 that describes an illumination sequence pattern that can be used to generate an illumination pattern in a captured image. The kiosk illuminates the subject face according to the illumination sequence pattern (and, in some implementations, acquires the image in a rolling shutter mode). In some implementations, the kiosks 222-226 provide the captured image to the server system 232 for verification. The server system 232 can decode the key from the received image data and verify the decoded key against a key that was previously provided to the respective kiosk. If the decoded key is verified, the server 232 can initiate a biometric authentication process (e.g., the captured image can be compared to a template image to identify the user).

This technique allows the server system 232 to challenge each of the kiosks 222-226 in the example environment 200 dynamically by changing keys in real time. For instance, if a decoded key does not match an expected key (e.g., due to, for example, a "man-in-the-middle" attack initiated by an imposter system 240), the server system 232 can prevent initiation of the biometric authentication process. For instance, the imposter system 240 can send, to the server system 232, an image that does not include an expected illumination pattern (e.g., because the imposter system 240 did not receive the initial key nor captured a subject image using an illumination sequence pattern defined by the key). In some implementations, the server 232 can send a message to a kiosk indicating failure to verify the key. In some implementations, the server system 232 ignores (e.g., does not respond to) a device that sends an image that is not successfully verified. The server system 232 can send an updated key to a respective kiosk on a periodic basis, intermittently (e.g., based on randomly generated time points), in response to an event, etc.

In further detail, the server system 232 can determine, based on the received data, that a first set of pixel values of the received image corresponds to illumination of a first representative wavelength, and at least a second set of pixel values of the received image corresponds to illumination of a second representative wavelength. The illuminations of the first and second representative wavelengths constitute at least a portion of a first illumination sequence pattern used in capturing the received image. The server system 232 can determine that the first illumination sequence pattern matches an expected illumination sequence pattern associated with an expected kiosk from which the received image is expected to be received. The expected kiosk can be a kiosk that was sent a key corresponding to the first illumination sequence pattern, for example. The server system 232 can, in response to determining that the first illumination sequence pattern matches the expected illumination sequence pattern, initiate a biometric authentication process for authenticating a subject represented in the received image.

As another example, the server system 232 can determine, for the received image or for another image, that the image does not include an expected illumination pattern. In response to determining that the image does not include an expected illumination pattern, the server 232 can prevent the image from being used in the biometric authentication process. The imposter system 240 may have sent an image to the server system 232 that was captured without a programmed illumination source, for example.

As yet another example, the imposter system 240 may send, to the server system 232, an image that has an illumination pattern generated by programmatic control of one or more illumination sources, but which does not match an expected illumination pattern. For instance, the received image may have been captured by a device other than the expected kiosk or by the expected kiosk at a time when the kiosk was configured with a different key than last recorded for the kiosk). The server system 232 can determine that a first set of pixel values of a received image corresponds to illumination of a third representative wavelength, and at least a second set of pixel values of the second image corresponds to illumination of a fourth representative wavelength, with the illuminations of the third and fourth wavelengths constituting at least a portion of a third illumination sequence pattern used in capturing the received image. The server system 232 can determine that the third illumination sequence pattern is different from the expected illumination sequence pattern associated with the kiosk from which the image is expected to have been received. In response to determining that the third illumination sequence pattern is different from the expected illumination sequence pattern, the server system 232 can prevent the received image from being used in the biometric authentication process.

In some implementations, the server system 232 can perform spoof detection based on the received image. For instance, different materials, such as live skin or spoof materials such as paper, silicon, or plastic can have different spectral responses to different wavelengths. An image of a live person can have a predictable reflectance response to illuminations at particular wavelengths, for example. The server system 232 can perform spoof detection by determining whether the received image includes expected reflectance responses corresponding to live skin.

In some implementations, the back-end system 230 includes computer systems employing clustered computers and components to act as a single pool of seamless resources when accessed through the network 210. For example, such implementations may be used in data center, cloud computing, storage area network (SAN), and network attached storage (NAS) applications. In some implementations, the back-end system 230 is deployed and provides computer-implemented services through a virtual machine(s).

Figure 3:
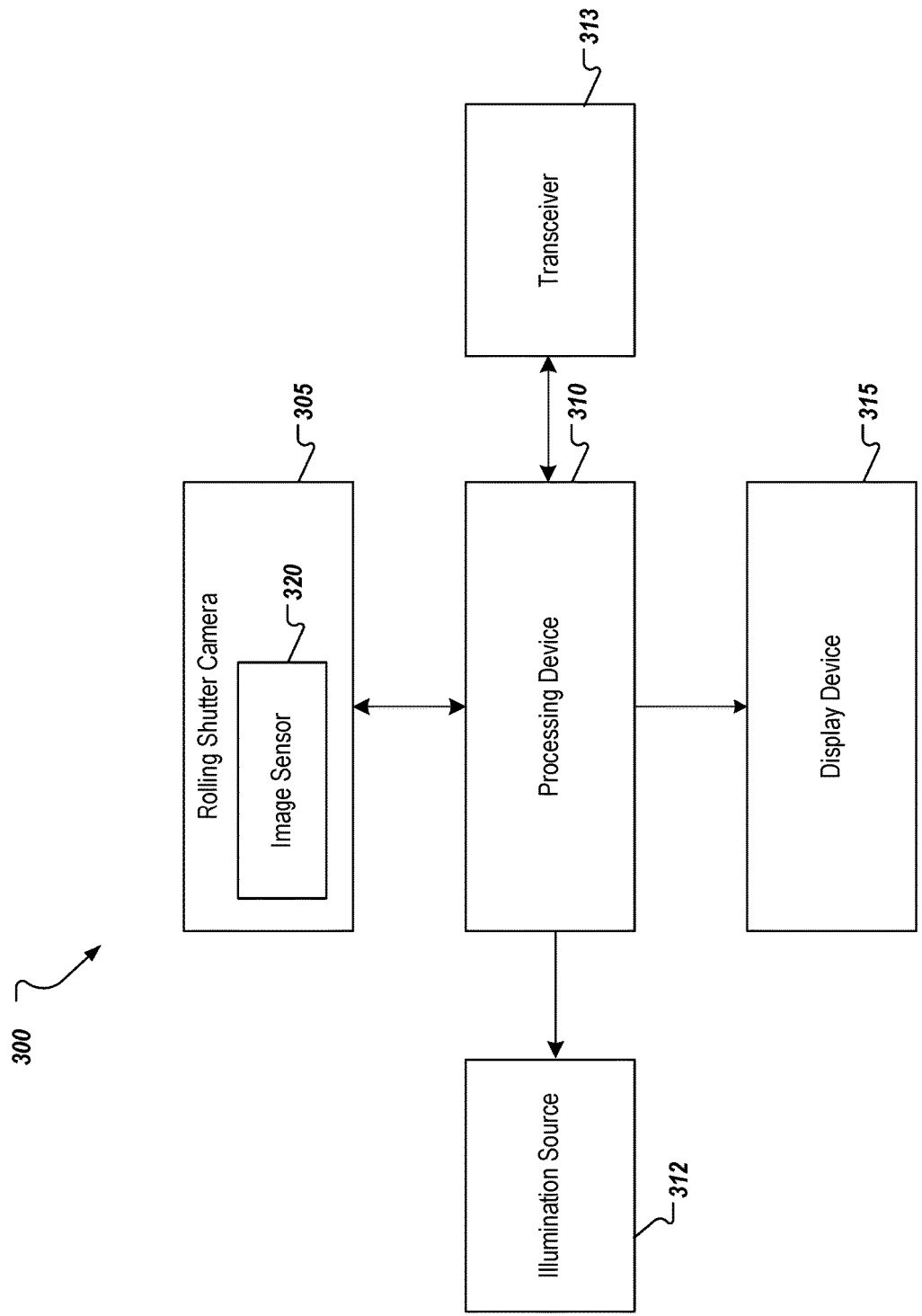
FIG. 3 depicts a system that can be used to implement the technology described herein.

FIG. 3 depicts a system 300 that can be used to implement the technology described herein. The system 300 includes a rolling shutter camera 305, a processing device 310, an illumination source 312, a transceiver 313, and a display device 315. In some implementations, the system 300 may be included within a kiosk, such as described with reference to FIG. 1. For example, the display device 315 can be the display device 110, the illumination source 312 can be the illumination source 115, and the rolling shutter camera 305 can be the camera 105. In some implementations, the display device 315 can be disposed on a mobile device, such as a smartphone, tablet computer, or an e-reader. The rolling shutter camera 305 includes an image sensor 320. The image sensor 320 detects and conveys the information that constitutes an image (e.g., the pixels collected through the rolling shutter as described above). Types of image sensors include, for example, complementary metal-oxide-semiconductor (CMOS) and charge-coupled devices (CCD).

The one or more processing devices 310 can synchronize the illuminations of the illumination source 312 with the rolling shutter camera 305 using an illumination sequence pattern. The illumination sequence pattern can be defined by a key that is received (e.g., from a server) using the transceiver 313. The one or more processing devices 310 can send a captured image, captured under an illumination pattern, to the server, using the transceiver 313. The server can verify that the illumination pattern in the captured image matches an expected illumination pattern. If the verification succeeds, a biometric authentication process can be initiated. For example, the captured image can be compared to a template image, to identify a particular user. If the user is authenticated, the one or more processing devices 310 may drive the display device 315. For example, the user can be provided access to one or more services.

Figure 4A:
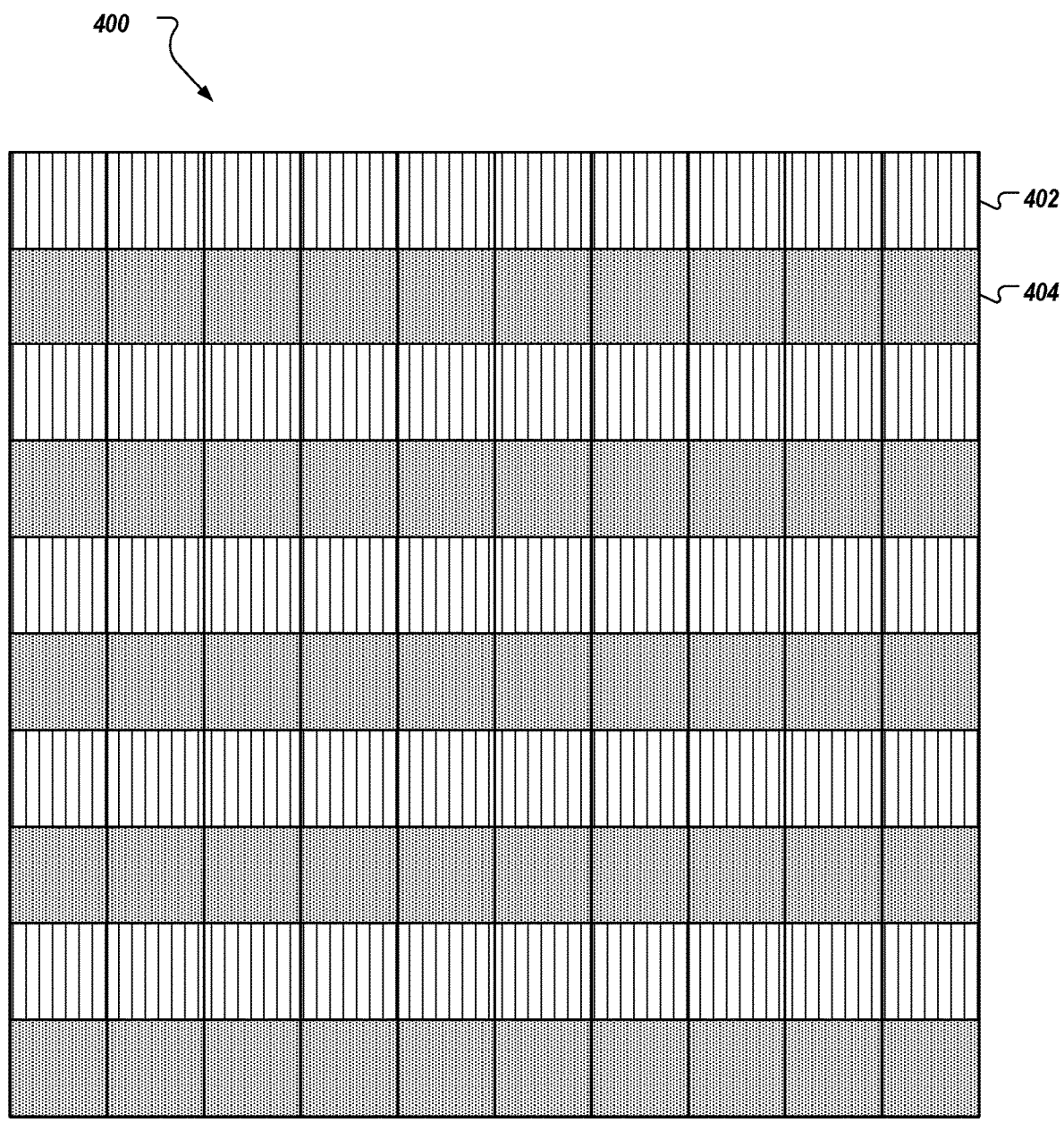
FIGS. 4A-4C are conceptual diagrams that depict example illumination patterns that can be employed within a biometric authentication system.
Figure 4B:
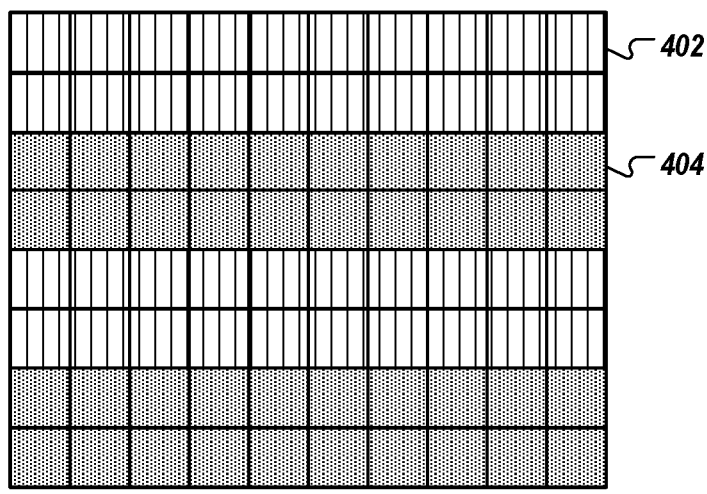
Figure 4C:
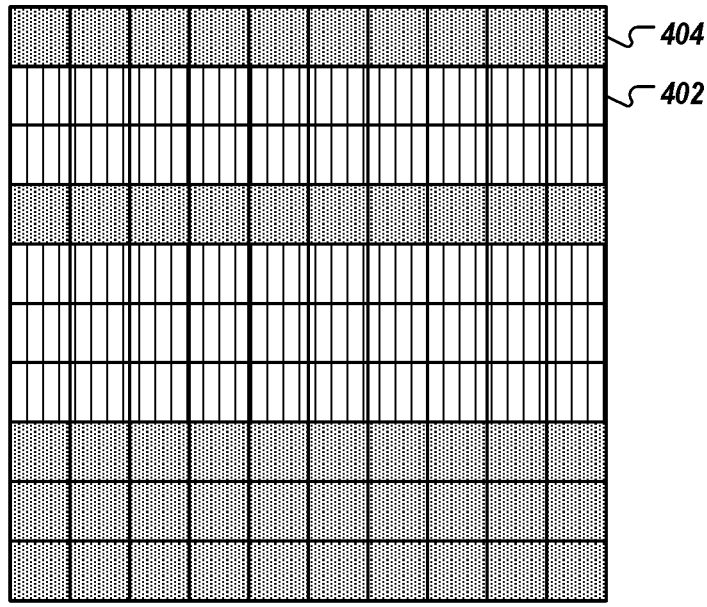

FIGS. 4A-4C depict example illumination patterns 400, 420, and 440, respectively, which can be employed within the described biometric authentication system. The illumination patterns 400, 420, and 440 are depicted as 10×10 grids where each square represent a pixel. The illumination patterns 400, 420, and 440 include rows of pixels 402 and 404. Pixel rows 402 and 404 represent rows of pixels captured (e.g., by a camera in rolling shutter mode) according to an illumination sequence pattern. For instance, striped pixel rows 402 are captured when an illumination source is illuminating at a first representative wavelength, as defined by the illumination sequence pattern. Similarly, shaded pixel rows 404 can be captured when the illumination source is illuminating at a second representative wavelength, as defined by the illumination sequence pattern. The rows of pixels 402 and 404 are linear groupings of pixels that may be oriented horizontally (e.g., as rows, as depicted) or vertically (e.g., as columns (not shown)).

For instance, in the illumination pattern 400, odd-numbered rows (e.g., the striped pixel rows 402) can be captured under illumination at a first representative wavelength and even numbered rows (e.g., the shaded pixel rows 404) can be captured under illumination at a second representative wavelength. As another example, the illumination pattern 420 can be generated according to an illumination sequence pattern that consists of illuminating a subject with the first representative wavelength while the rolling shutter exposes the first two striped pixel rows 402, then illuminating the subject with the second representative wavelength while the rolling shutter exposes the third and fourth shaded pixel rows 404, and then repeating the illumination pattern as the rolling shutter traverses the entire sensor. The illumination source can be activated in accordance with other illumination sequence patterns that are synchronized with the rolling shutter traversing various portions of the image sensor. For instance, FIG. 4C illustrates a general scheme where the number of rows that are exposed under illumination at either the first representative wavelength or the second representative wavelength are varied (e.g., randomly) as the rolling shutter traverses across the image sensor.

The size of the grid used to depict the illumination patterns 400, 420, and 440 is to provide a simple representation of a grid of pixel. Images captured by a camera, such as the camera 105, in a rolling shutter mode typically include much larger grids of pixels. Illumination patterns 400, 420, and 440 are provided as examples, and other illumination patterns can be generated and employed within the described biometric authentication system. Although first and second representative wavelengths are discussed, more than two representative wavelengths can be used.

Figure 5:
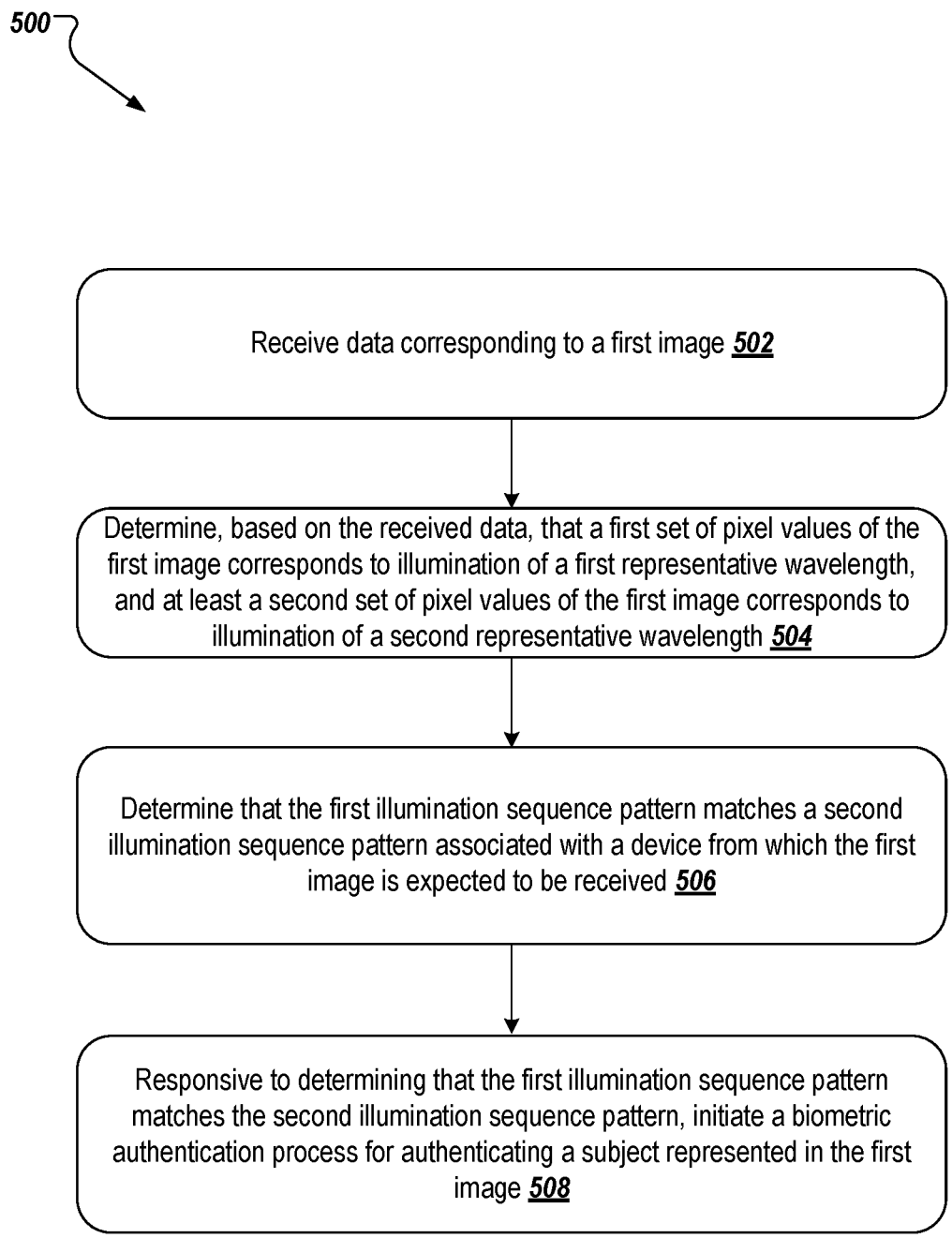
FIG. 5 is a flowchart of an example process employed within a biometric authentication system.

FIG. 5 depicts a flow diagram of an example process 500 employed within a biometric authentication system deployed on, for example, a kiosk device, such as kiosk 100 of FIG. 1. In some implementations, at least a portion of the process can be executed at the one or more processing devices 310 described above with reference to FIG. 3. At 502, data corresponding to a first image is received. The first image can be an image of a subject in a field of view of a camera associated with a device, such as a kiosk device.

At 504, a determination is made, based on the received data, that a first set of pixel values of the first image corresponds to illumination of a first representative wavelength, and at least a second set of pixel values of the first image corresponds to illumination of a second representative wavelength. The illuminations of the first and second representative wavelengths constitute at least a portion of a first illumination sequence pattern used in capturing the first image. In some implementations, the first image is captured using a rolling shutter that exposes the pixels of an image sensor in a row-wise manner. In some implementations, the first image is captured using a rolling shutter that exposes the pixels of an image sensor in a column-wise manner. In some implementations, the rolling shutter and an illumination source are synchronized during the capturing of the first image, according to the illumination sequence pattern. In some implementations, the illumination source is configured to generate electromagnetic radiation at multiple wavelengths.

At 506, a determination is made that the first illumination sequence pattern matches a second illumination sequence pattern associated with a device from which the first image is expected to be received. Information describing the second illumination sequence pattern may have been previously sent to the device, for example.

At 508, responsive to determining that the first illumination sequence pattern matches the second illumination sequence pattern, a biometric authentication process for authenticating a subject represented in the first image is initiated. In some implementations, the biometric authentication process includes authenticating the subject based on comparing the image to a template image of the subject. In some implementations, the template image of the subject was captured during an enrollment process. In some implementations, information to the subject is displayed, on a display device, based on the authentication of the subject.

In some implementations, data corresponding to a second image is received. A determination can be made that a first set of pixel values of the second image corresponds to illumination of a third representative wavelength, and at least a second set of pixel values of the image corresponds to illumination of a fourth representative wavelength. The illuminations of the third and fourth wavelengths can constitute at least a portion of a third illumination sequence pattern used in capturing the second image. A determination can be made that the third illumination sequence pattern is different from the second illumination sequence pattern associated with the device. Responsive to determining that the third illumination sequence pattern is different from the second illumination sequence pattern, the second image can be prevented from being used in the biometric authentication process.

Figure 6:
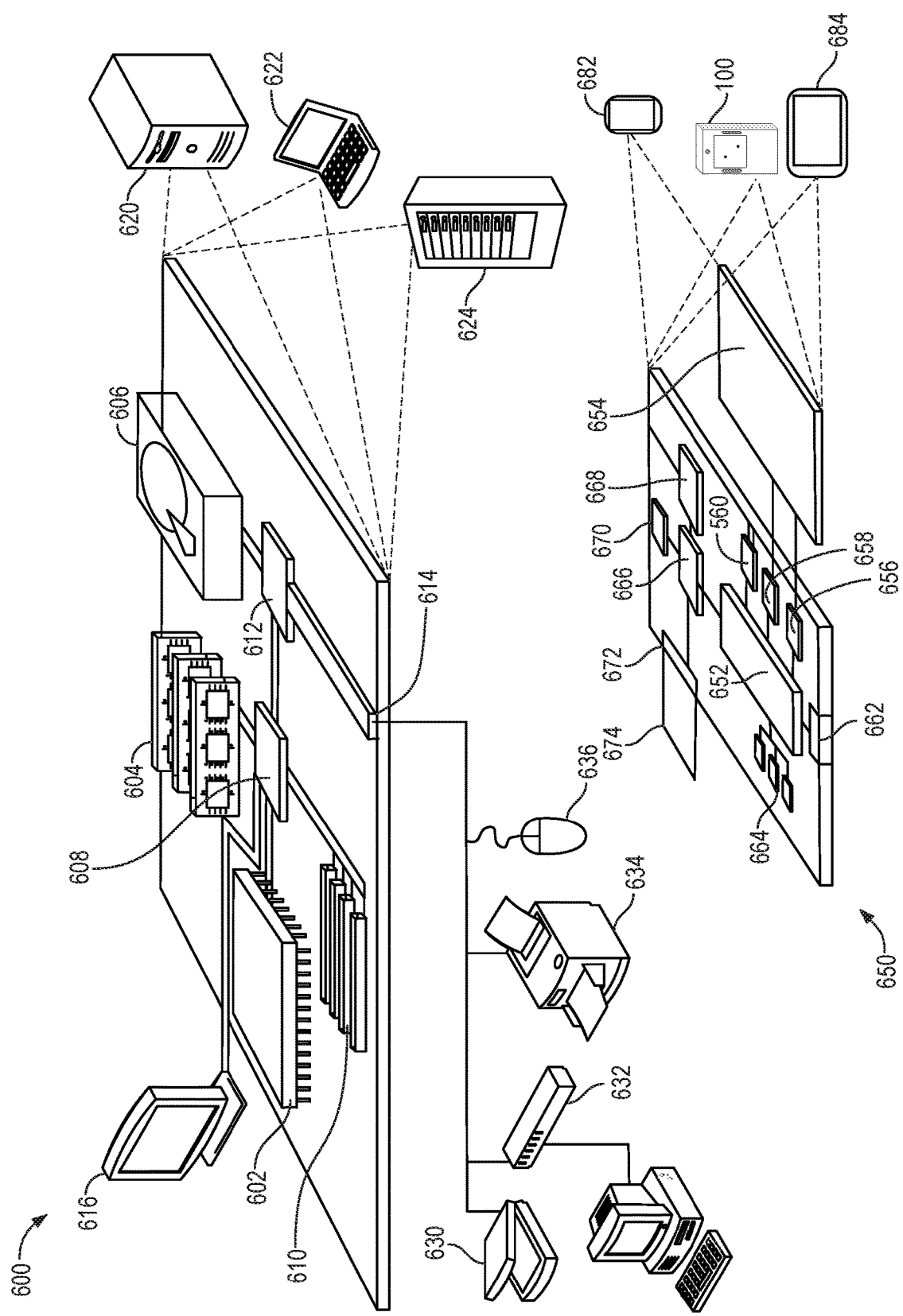
FIG. 6 is a block diagram representing examples of computing devices.

FIG. 6 shows an example of a computing device 600 and a mobile computing device 650 that are employed to execute implementations of the present disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting.

The computing device 600 includes a processor 602, a memory 604, a storage device 606, a high-speed interface 608, and a low-speed interface 612. In some implementations, the high-speed interface 608 connects to the memory 604 and multiple high-speed expansion ports 610. In some implementations, the low-speed interface 612 connects to a low-speed expansion port 614 and the storage device 606. Each of the processor 602, the memory 604, the storage device 606, the high-speed interface 608, the high-speed expansion ports 610, and the low-speed interface 612, are interconnected using various buses, and may be mounted on a common motherboard or in other manners as appropriate. The processor 602 can process instructions for execution within the computing device 600, including instructions stored in the memory 604 and/or on the storage device 606 to display graphical information for a graphical user interface (GUI) on an external input/output device, such as a display 616 coupled to the high-speed interface 608. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of a computer-readable medium, such as a magnetic or optical disk.

The storage device 606 is capable of providing mass storage for the computing device 600. In some implementations, the storage device 606 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 602, perform one or more methods, such as those described above. The instructions can also be stored by one or more storage devices, such as computer-readable or machine-readable mediums, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards. In the implementation, the low-speed interface 612 is coupled to the storage device 606 and the low-speed expansion port 614. The low-speed expansion port 614, which may include various communication ports (e.g., Universal Serial Bus (USB), Bluetooth, Ethernet, wireless Ethernet) may be coupled to one or more input/output devices. Such input/output devices may include a scanner 630, a printing device 634, or a keyboard or mouse 636. The input/output devices may also be coupled to the low-speed expansion port 614 through a network adapter. Such network input/output devices may include, for example, a switch or router 632.

The computing device 600 may be implemented in a number of different forms, as shown in the FIG. 6. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may contain one or more of the computing device 600 and the mobile computing device 650, and an entire system may be made up of multiple computing devices communicating with each other.

The mobile computing device 650 includes a processor 652; a memory 664; an input/output device, such as a display 654; a communication interface 666; and a transceiver 668; among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate. In some implementations, the mobile computing device 650 may include a camera device(s) (not shown).

The processor 652 can execute instructions within the mobile computing device 650, including instructions stored in the memory 664. The processor 652 may be implemented as a chip set of chips that include separate and multiple analog and digital processors. For example, the processor 652 may be a Complex Instruction Set Computers (CISC) processor, a Reduced Instruction Set Computer (RISC) processor, or a Minimal Instruction Set Computer (MISC)

processor. The processor 652 may provide, for example, for coordination of the other components of the mobile computing device 650, such as control of user interfaces (UIs), applications run by the mobile computing device 650, and/or wireless communication by the mobile computing device 650.

The processor 652 may communicate with a user through a control interface 658 and a display interface 656 coupled to the display 654. The display 654 may be, for example, a Thin-Film-Transistor Liquid Crystal Display (TFT) display, an Organic Light Emitting Diode (OLED) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a Single in Line Memory Module (SIMM) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provided as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 652, perform one or more methods, such as those described above. The instructions can also be stored by one or more storage devices, such as one or more computer-readable or machine-readable mediums, such as the memory 664, the expansion memory 674, or memory on the processor 652. In some implementations, the instructions can be received in a propagated signal, such as, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 668 using a radio frequency. In addition, short-range communication, such as using a Bluetooth or Wi-Fi, may occur. In addition, a Global Positioning System (GPS) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in FIG. 6. For example, it may be implemented the kiosk 100 described in FIG. 1. Other implementations may include a mobile device 682 and a tablet device 684. The mobile computing device 650 may also be implemented as a component of a smartphone, personal digital assistant, AR device, or other similar mobile device.

Computing device 600 and/or 650 can also include USB flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 210 of FIG. 2. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
   receiving, at one or more processing devices, first data corresponding to a first image of a subject captured by a biometric authentication system;
   determining, by the one or more processing devices based on the first data, a first illumination sequence pattern used in capturing the first image of the subject, wherein determining the first illumination sequence pattern is based on (i) a first set of pixel values of the first image of the subject corresponding to a first number of rows or columns of pixels of an image sensor, the first set of pixels obtained while the subject is illuminated by a first representative wavelength and (ii) at least a second set of pixel values of the first image of the subject corresponding to a second number of rows or columns of pixels of the image sensor, the second set of pixels obtained while the subject is illuminated by a second representative wavelength, wherein the first number of rows or columns of pixels is different from the second number of rows or columns, respectively, of pixels, and wherein the first set of pixel values of the first image of the subject is substantially unaffected by illumination of the subject by the second representative wavelength, and the at least a second set of pixel values of the first image of the subject is substantially unaffected by illumination of the subject by the first representative wavelength;
   determining, based upon information describing a second illumination sequence pattern having been previously received by the biometric authentication system, that the first illumination sequence pattern matches the second illumination sequence pattern; and
   responsive to determining that the first illumination sequence pattern matches the second illumination sequence pattern, initiating a biometric authentication process for authenticating the subject.

2. The computer-implemented method of claim 1, wherein the first image of the subject is captured using a rolling shutter that exposes the first set of pixels and the second set of pixels of the image sensor in a row-wise manner.

3. The computer-implemented method of claim 2, wherein the rolling shutter and an illumination source are synchronized during the capturing of the first image of the subject, according to the first illumination sequence pattern.

4. The computer-implemented method of claim 3, wherein the illumination source is configured to generate electromagnetic radiation at multiple wavelengths.

5. The computer-implemented method of claim 1, wherein the first image of the subject is captured using a rolling shutter that exposes the first set of pixels and the second set of pixels of the image sensor in a column-wise manner.

6. The computer-implemented method of claim 1, further comprising:
   receiving, at the one or more processing devices, data corresponding to a second image;
   determining, by the one or more processing devices, that a first set of pixel values of the second image corresponds to illumination of a third representative wavelength, and at least a second set of pixel values of the second image corresponds to illumination of a fourth representative wavelength, wherein the illuminations of the third and fourth representative wavelengths constitute at least a portion of a third illumination sequence pattern used in capturing the second image;
   determining that the third illumination sequence pattern is different from the second illumination sequence pattern associated with the device; and
   responsive to determining that the third illumination sequence pattern is different from the second illumination sequence pattern, preventing the second image to be used in the biometric authentication process.

7. The computer-implemented method of claim 1, wherein the biometric authentication process includes authenticating the subject based on comparing the first image of the subject to a template image of the subject.

8. The computer-implemented method of claim 7, wherein the template image of the subject is captured during an enrollment process.

9. The computer-implemented method of claim 7, comprising:
   presenting, on a display device, information to the subject based on results of authenticating the subject.

10. A system, comprising:
    a transceiver that receives data corresponding to a first image of a subject, as captured using an image sensor; and
    one or more processing devices communicatively coupled to the transceiver, the one or more processing devices performing operations comprising:
       receiving, at one or more processing devices, first data corresponding to a first image of a subject captured by a biometric authentication system;

determining, by the one or more processing devices based on the first data, a first illumination sequence pattern used in capturing the first image of the subject, wherein determining the first illumination sequence pattern is based on (i) a first set of pixel values of the first image of the subject corresponding to a first number of rows or columns of pixels of an image sensor, the first set of pixels obtained while the subject is illuminated by a first representative wavelength and (ii) at least a second set of pixel values of the first image of the subject corresponding to a second number of rows or columns of pixels of the image sensor, the second set of pixels obtained while the subject is illuminated by a second representative wavelength, wherein the first number of rows or columns of pixels is different from the second number of rows or columns, respectively, of pixels, and wherein the first set of pixel values of the first image of the subject is substantially unaffected by illumination of the subject by the second representative wavelength, and the at least a second set of pixel values of the first image of the subject is substantially unaffected by illumination of the subject by the first representative wavelength;

determining, based upon information describing a second illumination sequence pattern having been previously received by the biometric authentication system, that the first illumination sequence pattern matches the second illumination sequence pattern; and responsive to determining that the first illumination sequence pattern matches the second illumination sequence pattern, initiating a biometric authentication process for authenticating the subject.

11. The system of claim 10, further comprising a rolling shutter that exposes the first set of pixels and the second set of pixels of the image sensor in a row-wise manner.

12. The system of claim 11, wherein the rolling shutter and an illumination source are synchronized during the capturing of the first image of the subject, according to the first illumination sequence pattern.

13. The system of claim 10, further comprising a rolling shutter that exposes the first set of pixels and the second set of pixels of the image sensor in a column-wise manner.

14. The system of claim 10, wherein the operations further comprise:
receiving data corresponding to a second image;
determining that a first set of pixel values of the second image corresponds to illumination of a third representative wavelength, and at least a second set of pixel values of the second image corresponds to illumination of a fourth representative wavelength, wherein the illuminations of the third and fourth representative wavelengths constitute at least a portion of a third illumination sequence pattern used in capturing the second image;
determining that the third illumination sequence pattern is different from the second illumination sequence pattern associated with the device; and
responsive to determining that the third illumination sequence pattern is different from the second illumination sequence pattern, preventing the second image to be used in the biometric authentication process.

15. The system of claim 10, wherein an illumination source is configured to generate electromagnetic radiation at multiple wavelengths.

16. The system of claim 10, wherein the biometric authentication process includes authenticating the subject based on comparing the first image of the subject to a template image of the subject.

17. One or more non-transitory computer-readable storage devices coupled to one or more processors and having instructions stored thereon which, when executed by the one or more processors, cause the one or more processors to perform operations comprising:
receiving, at one or more processing devices, first data corresponding to a first image of a subject captured by a biometric authentication system;
determining, by the one or more processing devices based on the first data, a first illumination sequence pattern used in capturing the first image of the subject, wherein determining the first illumination sequence pattern is based on (i) a first set of pixel values of the first image of the subject corresponding to a first number of rows or columns of pixels of an image sensor, the first set of pixels obtained while the subject is illuminated by a first representative wavelength and (ii) at least a second set of pixel values of the first image of the subject corresponding to a second number of rows or columns of pixels of the image sensor, the second set of pixels obtained while the subject is illuminated by a second representative wavelength, wherein the first number of rows or columns of pixels is different from the second number of rows or columns, respectively, of pixels, and wherein the first set of pixel values of the first image of the subject is substantially unaffected by illumination of the subject by the second representative wavelength, and the at least a second set of pixel values of the first image of the subject is substantially unaffected by illumination of the subject by the first representative wavelength;
determining, based upon information describing a second illumination sequence pattern having been previously received by the biometric authentication system, that the first illumination sequence pattern matches the second illumination sequence pattern; and
responsive to determining that the first illumination sequence pattern matches the second illumination sequence pattern, initiating a biometric authentication process for authenticating the subject.

18. The one or more non-transitory computer-readable storage devices of claim 17, wherein the first image of the subject is captured using a rolling shutter that exposes the first set of pixels and the second set of pixels of the image sensor in a row-wise manner or a column-wise manner.

19. The one or more non-transitory computer-readable storage devices of claim 17, further comprising instructions for:
receiving data corresponding to a second image;
determining that a first set of pixel values of the second image corresponds to illumination of a third representative wavelength, and at least a second set of pixel values of the second image corresponds to illumination of a fourth representative wavelength, wherein the illuminations of the third and fourth representative wavelengths constitute at least a portion of a third illumination sequence pattern used in capturing the second image;
determining that the third illumination sequence pattern is different from the second illumination sequence pattern associated with the device; and
responsive to determining that the third illumination sequence pattern is different from the second illumination sequence pattern, preventing the second image to be used in the biometric authentication process.

20. The one or more non-transitory computer-readable storage devices of claim 17, wherein the biometric authentication process includes instructions for authenticating the subject based on comparing the first image of the subject to a template image of the subject.

* * * * *

UNITED STATES PATENT AND TRADEMARK OFFICE
CERTIFICATE OF CORRECTION

PATENT NO. : 11,347,961 B2  
APPLICATION NO. : 16/795148  
DATED : May 31, 2022  
INVENTOR(S) : Srikanth Parupati, Zikomo Fields and Reza R. Derakhshani Page 1 of 1

It is certified that error appears in the above-identified patent and that said Letters Patent is hereby corrected as shown below:

In the Specification

Column 1, Lines 9-10, delete "16/795,148, filed Feb. 19, 2020," and insert -- 16/370,525, filed Mar. 29, 2019, --.

Signed and Sealed this  
Thirtieth Day of August, 2022

Katherine Kelly Vidal  
*Director of the United States Patent and Trademark Office*